Nov. 5, 1946.　　　　B. J. BABBITT　　　　2,410,621
OPTICAL QUARTZ CRYSTAL TESTING APPARATUS
Filed Nov. 7, 1942　　　　4 Sheets-Sheet 1

INVENTOR.
B. J. BABBITT
BY
ATTORNEY

Patented Nov. 5, 1946

2,410,621

UNITED STATES PATENT OFFICE 2,410,621

OPTICAL QUARTZ CRYSTAL TESTING APPARATUS

Bethel J. Babbitt, Riverside, Ill., assignor to Western Electric Company, Incorporated, New York, N. Y., a corporation of New York Application November 7, 1942, Serial No. 464,847

10 Claims. (Cl. 88—14)

This invention relates to optical testing apparatus, and more particularly to apparatus for determining the optical axis of quartz crystals.

An object of the present invention is to provide an effective and convenient apparatus for determining the optical axis of quartz crystals and particularly of irregularly shaped quartz crystal fragments.

In accordance with one embodiment of this invention, an apparatus for testing quartz crystals may be provided having a table for supporting a crystal to be tested in a tank of immersion fluid. Externally operated adjustments are also provided for moving the table vertically, for rotating the table about a vertical axis and for tilting the table about a horizontal axis.

Other objects and advantages of the present invention will be apparent from the following detailed description taken in conjunction with the drawings wherein.

In the manufacture of piezoelectric crystals, such as those used in frequency control circuits of certain types of electrical apparatus, before cutting the large quartz crystals from which the control crystals are formed, it is sometimes the practice to determine the optical axis of the crystal by a device known as a conoscope.

A conoscope is a device whereby a cone of rays of polarized light may be passed through a crystal or other object and the light pattern observed by an analyzing optical system. A system of concentric interference rings is seen when the light passes through the crystal along the optical axis thereof. The size of the rings depends upon the angle of convergence of the light, the greater the angle of convergence, the smaller are the rings; and the thicker the crystal, the smaller are the rings.

Once the optical axis of the crystal has been determined, the crystal may then be cut at a predetermined angle to the optical axis to obtain slabs which will have the desired electrical and mechanical properties. However, obtaining these properties depends largely on the accuracy with which the optical axis can be determined and one or more sides of the crystal cut with reference thereto. The present apparatus provides a means for determining the optical axis with a high degree of accuracy and for indicating precisely what lapping or cutting of a side or sides of the crystal is required to make that side or sides perpendicular to the optical axis.

Figure 3:
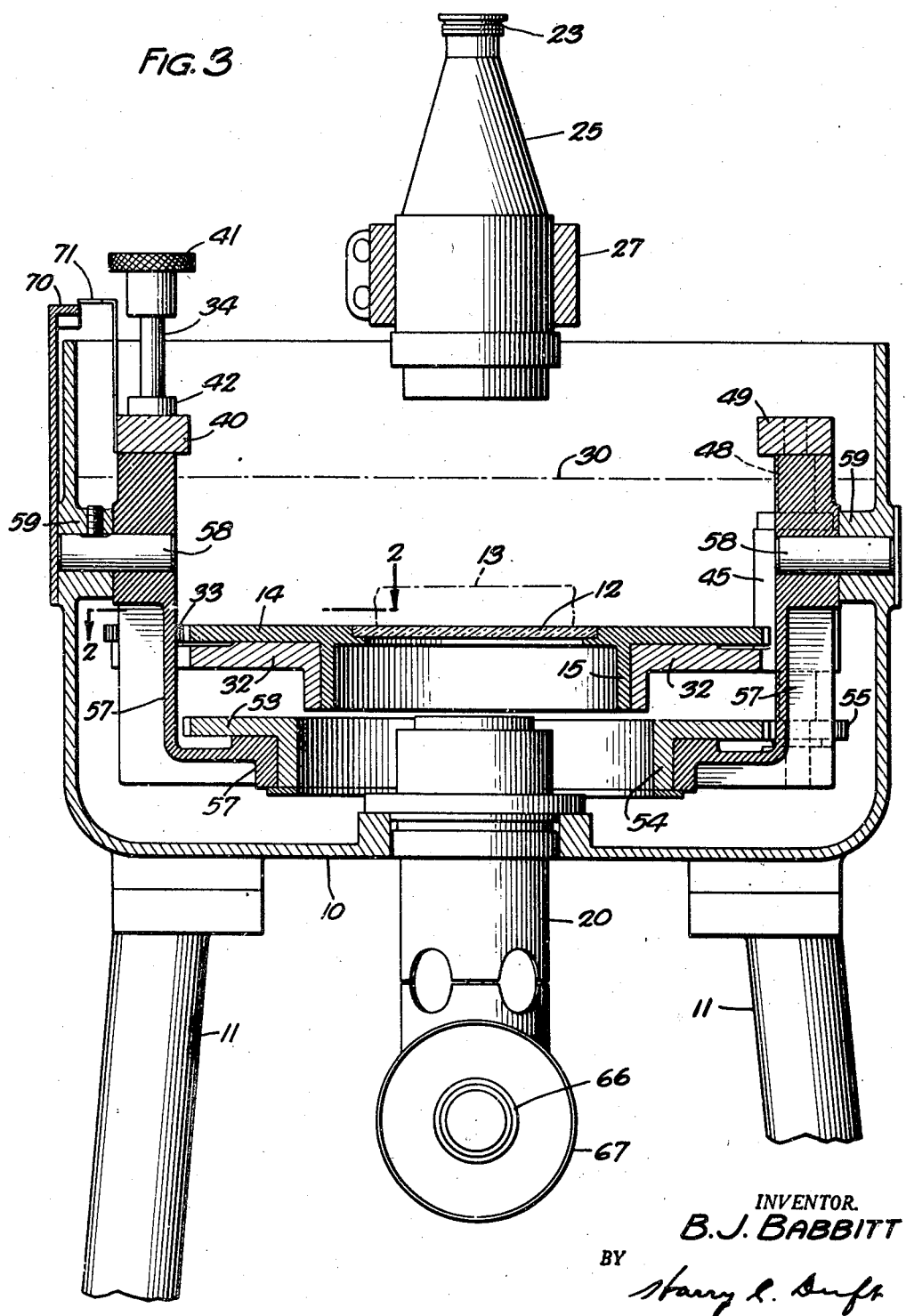
Fig. 3 is a vertical sectional view along the line 3—3 of Fig. 1.
Figure 4:
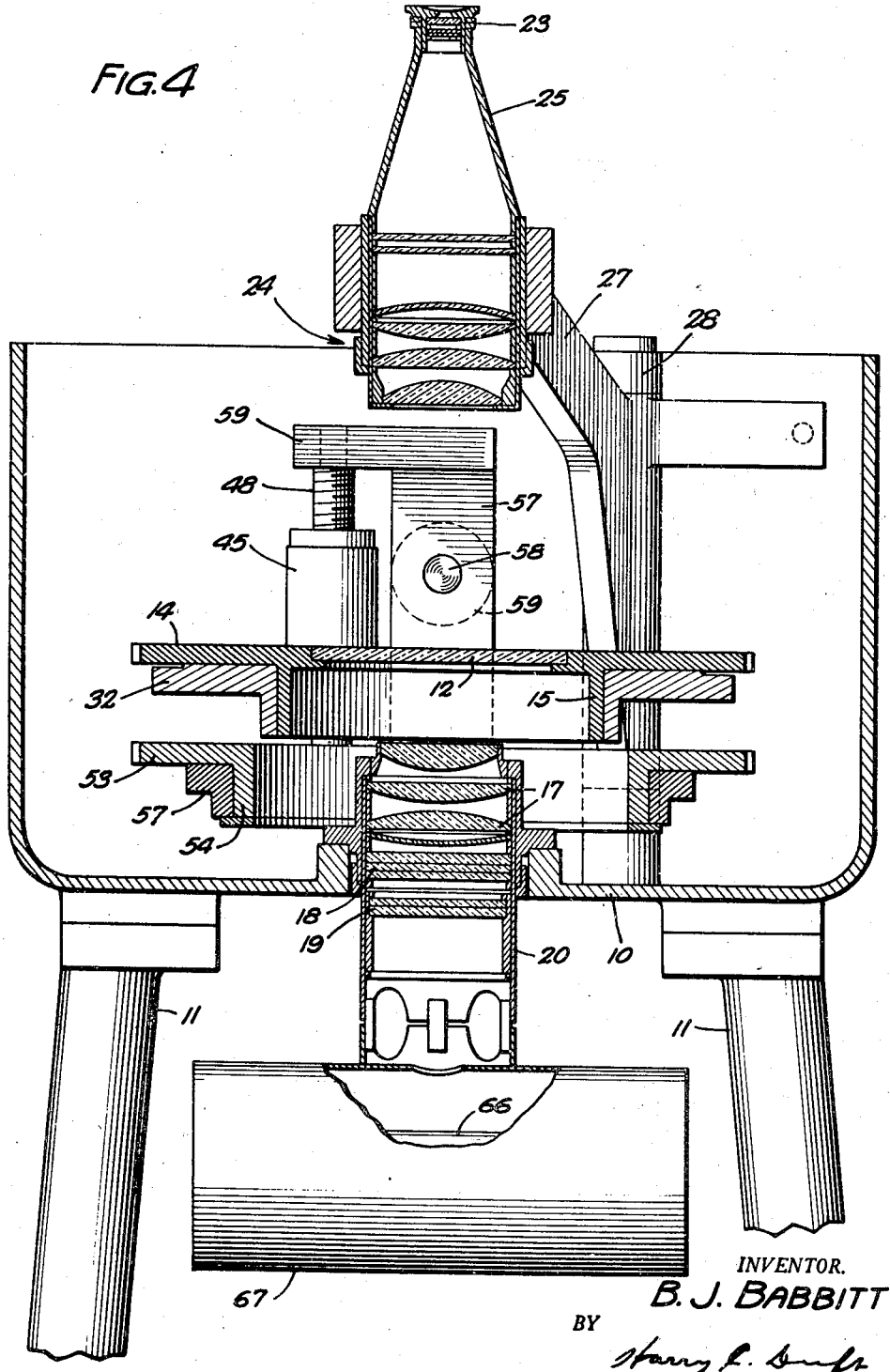
Fig. 4 is a vertical sectional view along the line 4—4 of Fig. 1.

Referring now to the drawings and particularly to Figs. 3 and 4, an optical testing apparatus or conoscope is there shown having a tank 10 mounted on four legs 11. A circular disc 12 of glass, or other transparent material, on which a crystal 13 to be tested may be placed, forms the center portion of a circular table 14 which is positioned inside the tank. In order to provide a cone of polarized light, a lamp 66 is positioned in a housing 67 which is attached to the underside of the base of the tank 10, as shown in Fig. 4, and an optical system, comprising a condenser 17, polarizer 18 and filter 19, mounted in a barrel housing 20, forms a cone of light which extends upwardly through the disc 12 and converges to a focal point in the area above the disc. In practice the position of the crystal to be tested is adjusted vertically, by means to be explained hereinafter, so that the light will converge at a point within the crystal.

Figure 1:
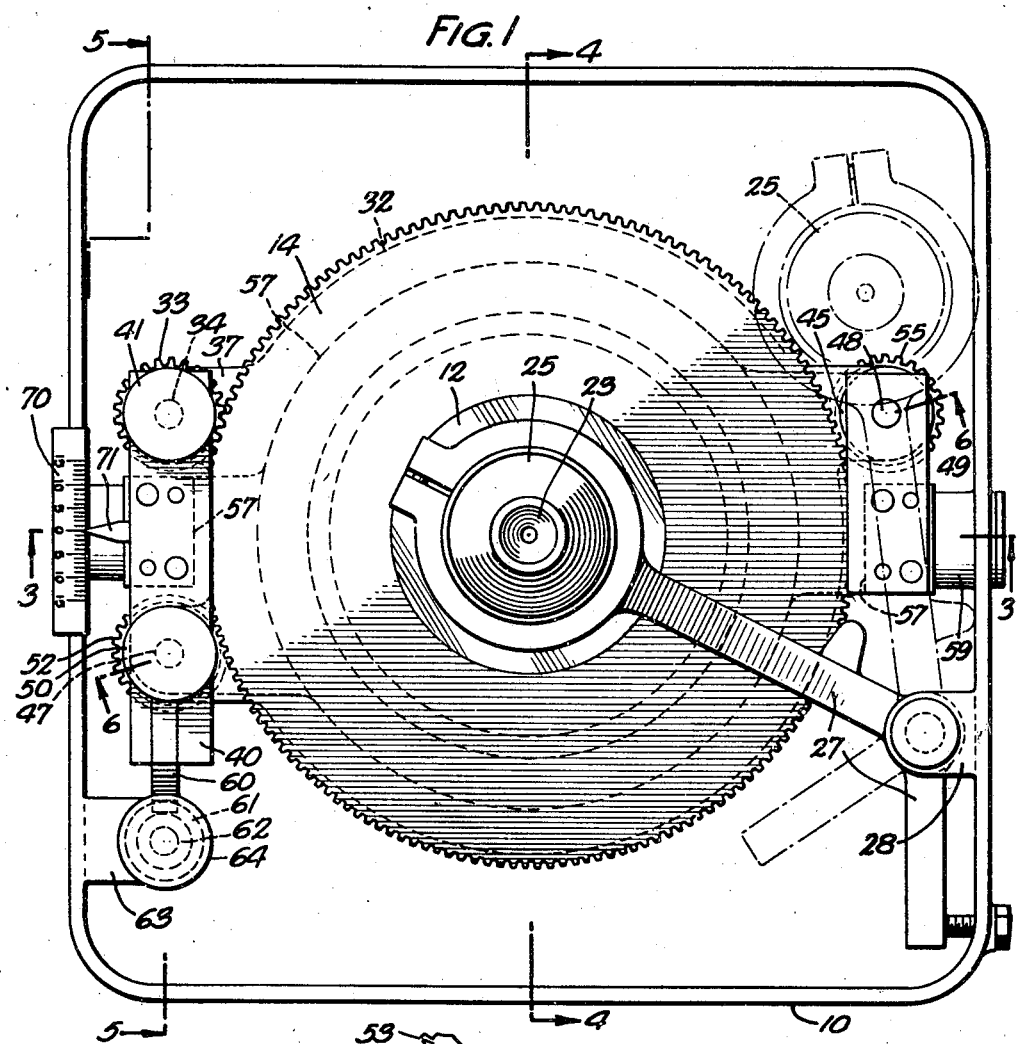
Fig. 1 is a plan view of an apparatus constructed in accordance with this invention.
Figure 2:
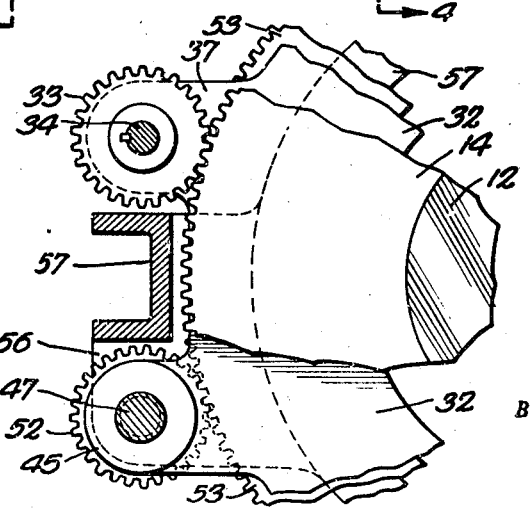
Fig. 2 is an enlarged fragmentary horizontal sectional view along the line 2—2 of Fig. 3.

Observation of the effect on the light passing through the crystal is made through an optical condensing system 24 and an analyzer consisting of an eye piece 23 containing a polarizing filter. This portion of the apparatus is contained in a housing 25. The housing 25 is attached to a bracket arm 27 which is pivotally mounted on an inwardly projecting lug 28 integrally formed on the tank 10, as shown in Fig. 1.

In order to facilitate the ascertainment of the optical axis of the crystal, the crystal to be tested is lapped on one side as nearly as possible perpendicularly to the optical axis of the crystal, the optical axis having been roughly determined in advance. A section is then sawed from the rough crystal, the cut being substantially parallel to the lapped side. This section is then inspected to determine if the cut is perpendicular to the optical axis and, if not, to determine what adjustment of the direction of cut is necessary. If the crystal has been properly lapped perpendicularly to its optical axis, the rings will remain stationary when the crystal is rotated. The direction of cut of the saw is then changed, as appears to be necessary, and the remainder of the crystal is cut into sections having substantially parallel faces as nearly as possible perpendicular to the optical axis. As a final check on the accuracy with which the crystal has been cut and to indicate what further cutting or lapping is necessary to bring the cut sides perpendicular to the optical axis of the crystal, a section of the crystal is then placed on the transparent disc in the table 14, the sawed side being placed against the upper surface of the disc which is on a plane perpendicular to the analyzing beam of light so that if the optical axis of the crystal is perpendicular to this side, the axis of the cone of light will pass through the crystal parallel to the optical axis of the crystal. Since the surfaces of many crystals are often quite uneven, in order to prevent refraction of the beam of light by such uneven surfaces of the crystal being tested, the tank 10 is filled with an immersion fluid 30 having an index of refraction substantially the same as that of the crystal. Enough fluid is used to completely immerse the crystal.

In the usual case, the crystal will not have been cut exactly perpendicularly to the optical axis and some small adjustment of the position of the crystal in the conoscope must be made in order to bring the optical axis of the crystal parallel to the axis of the cone of light. Adjustment of the position of the crystal in the present conoscope is possible in three directions. The crystal may be tilted about a horizontal axis, it may be raised or lowered and it may be rotated about a vertical axis. All three adjustments are readily and accurately made by controls positioned outside of the tank and the degree of tilt required to bring the optical axis of the crystal parallel to the axis of the cone of light accurately indicated. It will be apparent that the degree of tilt required to do this will be equal to the degree by which the cut side fails to be perpendicular to the optical axis and that once the degree of tilt required is known, it is merely necessary to lap that side of the crystal to the angle indicated to make it perpendicular to the optical axis.

As aforesaid, when the optical axis of the crystal is parallel to the axis of the cone of light, the interference rings will remain stationary when the crystal is revolved. Since the optical axis of a crystal is not a single line extending through the crystal from a single point on one face thereof to a single point on an opposing face but, rather, any one of an almost infinite plurality of lines comprising the optical axis of each of the myriad individual crystals which are grouped together to form the homogeneous crystalline body, the optical axis of each crystal in that body being parallel to that of every other crystal therein, the precise position of the cut crystal section with respect to the axis of the cone of light is not critical and no particular point on the sawed side of the crystal need be brought into line with the axis of the cone of light. Thus, it is necessary only that the crystal being tested be placed on the transparent disk in such a position that the axis of the cone of light pass through some portion of the crystal.

In order to provide an easily rotatable mounting for the crystal, the table 14 is rotatably mounted on a vertically movable, annularly shaped platform 32. An annularly shaped platform is used so as to permit the light to pass through the crystal. A downwardly extending flanged portion 15 of the table 14 extends through the open interior portion of the platform 32 to center the table with respect to the platform, the upper surface of the platform contacting the underside of the outer portion of the table.

The periphery of the table is toothed as shown in Fig. 1, and is engaged by a pinion gear 33, splined to a vertically mounted shaft 34. The lower portion, or hub 35, of the pinion gear 33, extends through a suitable aperture in a lug 37, which projects from and is an integral part of the platform 32. In order to move the pinion gear 33 up or down as the table 14 is moved, a locking ring 38 is mounted on the lower portion of the hub 35 and contacts the underside of the lug 37. Since the base of the toothed portion of the pinion gear 33 rests on the upper surface of the lug 37, it will be apparent that if the platform 32 moves up or down, carrying with it the table and crystal, the gear 33 will also be moved an equivalent distance up or down the splined shaft 34, thus keeping it in constant engagement with the toothed portion of the table.

The upper portion of the pinion gear shaft 34 extends through a cross beam 40 fixed to the upper portion of a cradle housing 57. A knob 41 is attached to the upper end of the shaft and locking rings 42 are positioned on the shaft 34 both above and below the cross beam 40 in order to hold the shaft in position. Rotation of the knob 41 causes the table 14 to be rotated.

Figure 5:
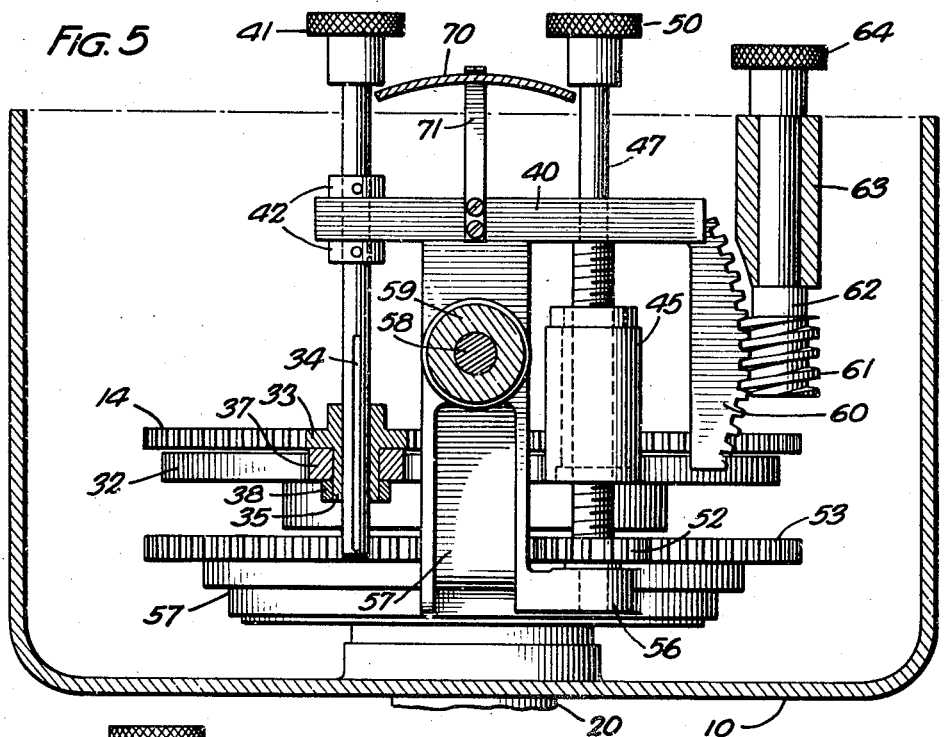
Fig. 5 is a vertical sectional view along the line 5—5 of Fig. 1.
Figure 6:
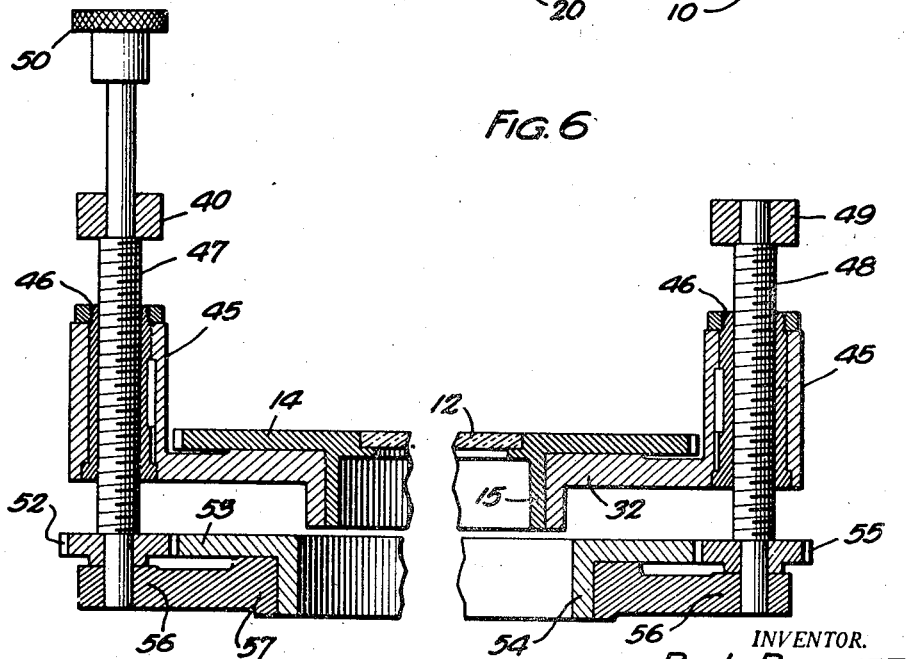
Fig. 6 is a fragmentary sectional view along the line 6—6 of Fig. 1.

It is desirable that the cone of light converge at near the center of the crystal in the vertical direction to obtain maximum intensity of illumination. In order to center crystals of varying size with respect to the focal point of illumination, the table 14 may be moved vertically by elevating or lowering the supporting platform 32. Two hollow posts 45 integrally formed on opposite sides of the platform 32 are provided with interiorly threaded sleeves 46 which engage vertically mounted threaded shafts 47 and 48, as shown in Fig. 6. These shafts form the sole support for the platform. The lower ends of both shafts are journalled into projecting lugs 56 integrally formed in the base of the cradle housing 57 which is in turn supported at either side by shafts 58 which extend through integrally formed trunnions 59 in the sides of the tank, as shown in Fig. 3. The upper end of the shaft 47 extends through a suitable aperture in the cross beam 40, as shown in Fig. 5. The upper end of the shaft 48 is journalled into a cross member 49 which is mounted on the upper surface of the cradle 57.

Vertical adjustment of the crystal's position is accomplished by rotating the threaded shafts 47 and 48 to cause the table supporting platform 32 to be raised or lowered relatively to the cradle housing. A gear 52 is keyed to the lower end of shaft 47 and engages a large spur gear 53 rotatably mounted on the base of the cradle housing 57. The center portions of this gear and of the base of the cradle housing are cut out to permit the light to pass through to the crystal. The underside of the flanged portion of the spur gear rests on the base of the cradle, which is suitably configured as shown in Fig. 6, to receive the spur gear hub 54. A second pinion gear 55, of the same size as the gear 52, is keyed to the lower end of the right hand shaft 48 and is driven by the large gear 53. Rotation of the left hand shaft 47, which is provided with a knob 50 at the upper end thereof, causes the platform to move up or down, the shaft 48 being simultaneously rotated. Since the small gears 52 and 55 are the same size, both shafts will be rotated at the same speed, and consequently the platform will be lifted or lowered from both sides at the same rate. It will be understood that the upper end of the shaft 48 could be extended and provided with a knob to permit vertical adjustment of the position of the platform 32 from either side if desired.

In addition to centering the crystal with respect to the focal point of the cone of light by raising or lowering the table in the immersion fluid, by raisng the surface of the table 14 to the surface of the immersion fluid, it is possible to check the level of the table. The surface of the table should be perfectly horizontal when the cradle housing is not tilted and is perpendicular to the optical axis of the viewing optical system and to the axis of the cone of polarized light. These two axes are in direct line with one another. The zero tilt position of the cradle may also be ascertained in this way.

Having adjusted the vertical position of the crystal with respect to the focal point of the cone of light by raising or lowering the platform as necessary, the next step is to determine by how many degrees, if any, the lapped side of the crystal fails to be perpendicular to the optical axis of the crystal. The operator, unless the crystal is properly lapped, must tilt the crystal with respect to the axis of the cone of light to bring the optical axis parallel thereto. Provision is made in the present apparatus for tilting the crystal by tilting the cradle housing 57 on the shafts 58. An arcuate toothed member 60, fixed to one end of the cross beam 40, which is fixed to the upper portion of the cradle housing, is engaged by a worm gear 61 keyed to a rotatable shaft 62 which is journalled into and supported by a projecting lug 63 formed on the inner side of the tank 10, as shown in Figs. 1 and 5. Since the cradle housing 57 carries the platform 32 and table 14, the crystal to be tested may be tilted with respect to the axis of the cone of light, as may be required to bring the optical axis of the crystal in line therewith, by rotating the worm gear shaft 62 by a knob 64, keyed to the upper end of the shaft 62, to cause the cradle to tilt to the desired degree.

A graduated scale 70 is mounted on the upper edge of the tank 10, as shown in Fig. 1, and a pointer arm 71 is fixed on the cross beam 40 and mounted perpendicularly thereto so as to be moved thereby relatively to the scale when the cradle is tilted. The degree of tilt required to bring the optical axis of the crystal in line with the beam of light is thus indicated.

As a final step, the crystal is rotated by rotating the table 14 by turning the knob 41. If the crystal has been properly lapped in a plane perpendicular to its optical axis, the interference rings will remain stationary.

While but one embodiment of this invention has been shown and described, it will be understood that many changes and modifications may be made therein without departing from the spirit or scope of the present invention.

What is claimed is:

1. In an optical testing apparatus, a tank for receiving a liquid having an index of refraction similar to that of the article to be tested, an optical system for passing a beam of light vertically through said tank and having a predetermined focal point within said tank, a cradle in said tank mounted for tilting movement, a table for supporting an article to be tested in the beam of light, said table being mounted in said cradle for rotation in its own plane, means for rotating said table relative to said cradle in the plane of the table, a plurality of threaded members mounted on said cradle, means threadedly engaging said threaded members and movable up and down thereby for rotatably supporting said table, and means for simultaneously rotating the threaded members equal amounts for raising and lowering said supporting means and said table along said beam of light relative to said tank to bring the focal point of the beam of light within the article under test.

2. In an optical testing apparatus, a tank for receiving a liquid having an index of refraction similar to that of the article to be tested, an optical system for passing a beam of light vertically through said tank and having a predetermined focal point within said tank, a cradle mounted in said tank for tilting movement, a table rotatable in its own plane for supporting an article to be tested in the beam of light, means for rotating said table relative to said cradle in the plane of the table including an actuating element extending out of said tank, a plurality of rotatable threaded members mounted on said cradle, means threadedly supported on and vertically movable by said threaded members for rotatably supporting the table, means interconnecting said threaded members for imparting simultaneous and equal rotation to said threaded members, and means extending out of said tank for rotating one of said threaded members for raising and lowering said supporting means and said table along said beam of light relative to said tank to bring the focal point within the article to be tested.

3. In an optical testing apparatus, a tank for receiving a liquid having an index of refraction similar to that of the article to be tested, an optical system for passing a beam of light through said tank and having a predetermined focal point within said tank, a cradle in the tank and pivotally supported thereby for tilting movement, a plurality of rotatable threaded members mounted on the cradle, a support threadedly mounted on and movable up and down by said threaded members, a table in the beam of light and rotatable in its own plane for supporting an article to be tested in the beam of light, said table being rotatably mounted on said support, means for simultaneously rotating said threaded members equal amounts to raise and lower the support and the table to bring the focal point within the article under test, and means for rotating said table on said support in the plane of the table.

4. In an optical testing apparatus, a tank for receiving a liquid having an index of refraction similar to that of the article to be tested, an optical system for passing a beam of light through said tank and having a predetermined focal point within the tank, a cradle in said tank and pivotally supported thereby for tilting movement, a plurality of rotatable threaded members mounted on said cradle, a transparent table rotatable in its own plane and intersecting the light beam for supporting an article to be tested in the beam of light, a support for rotatably supporting the transparent table threadedly mounted on and movable up and down by said threaded members, each of said threaded members having a gear thereon, a common gear engaging all of the gears on said threaded members whereby the rotation of one of said gears will rotate all of said gears to rotate the threaded members and uniformly raise and lower the support relative to said cradle and said tank to bring the focal point within the article, and means for rotating one of said threaded members.

5. In an optical testing apparatus, a tank for receiving a liquid having an index of refraction similar to that of the article to be tested, an optical system for passing a beam of light through said tank and having a predetermined focal point within the tank, a cradle in said tank and pivotally supported thereby for tilting movement, a table mounted on said cradle for rotation in its own plane and having a light transmitting portion in the beam of light for supporting an article to be tested in the path of said light beam, means for rotating said table relative to said cradle in the plane of the table including a gear surrounding and attached to said table, a driving gear therefor mounted for vertical movement with said table and a shaft for actuating said driving gear, means mounting the table on the cradle for vertical movement along the beam of light and relative to said cradle and said tank to bring the focal point within the article, said shaft being rotatably mounted on said cradle and having a splined driving connection with said driving gear to permit vertical movement of said driving gear with the table as it is raised and lowered.

6. In an optical testing apparatus, a tank for receiving a liquid having an index of refraction similar to that of the article to be tested, said tank having a transparent element in its base, a tiltable cradle mounted in said tank and having an opening in alignment with said transparent element in the tank, a table having a transparent element in vertical alignment with the transparent element in said tank for supporting an article to be tested in vertical alignment with the transparent element in the tank, a support for rotatably supporting said table for rotation in its own plane and having an opening coinciding with the transparent element in said table, an optical system for passing a beam of light vertically through the aligned transparent elements of said tank and said table and through the article to be tested and having a predetermined focal point within said tank, a plurality of rotatable threaded members mounted on said cradle and threadedly engaging said support for supporting said support and imparting up and down movement thereto, means for rotating said threaded members equal amounts for raising and lowering said support and said table along the beam of light to bring the focal point within the article on the table, and means mounted on said cradle for rotating said table relative to said cradle in the plane of said table.

7. In an optical testing apparatus, a tank for receiving a liquid having an index of refraction similar to that of the article to be tested, said tank having a transparent element in its base, a tiltable cradle mounted in said tank and having an opening in alignment with said transparent element in the tank, a movable table having a transparent element in vertical alignment with the transparent element in said tank for receiving an article to be tested in vertical alignment with the transparent element in the tank, a support movable up and down for supporting said table for rotation in its own plane and having an opening coinciding with the transparent member in said table, means mounted on said cradle for raising and lowering said support including an actuating element extending outside of said tank, means mounted on said cradle for rotating said table in the plane of said table relative to said cradle including an actuating element extending out of said tank, an optical system for passing a beam of light through the aligned transparent elements of said tank and said table and through the article, said optical system having a predetermined focal point within said tank so that by raising or lowering the support and the table said focal point may be brought within the article supported on said table, and means for tilting said cradle.

8. In an optical testing apparatus, a tank for receiving a liquid having an index of refraction similar to that of the article to be tested, an optical system for passing a beam of light vertically through said tank and having a fixed focal point within the tank, a cradle in said tank pivotally supported thereby for tilting movement and having an opening in alignment with the beam of light, a table mounted on said cradle for rotation in its own plane and having a transparent portion in the beam of light for supporting an article to be tested in the beam of light, means mounted on said cradle for rotating said table relative to said cradle in the plane of said table, and means mounted on said cradle for raising and lowering said table along said beam of light relative to said tank and said focal point whereby said focal point may be brought within the article supported on said table.

9. In an optical testing apparatus, a tank for receiving a liquid having an index of refraction similar to that of the article to be tested, said tank having a transparent element in its base, an optical system for passing a beam of light vertically through the tank and the transparent element and having a fixed focal point within the tank, a cradle in said tank and pivotally supported thereby for tilting movement and having an opening in alignment with said beam of light, a plurality of threaded members mounted on the cradle, a support threadedly mounted on and movable up and down by the threaded members and having an opening in alignment with said beam of light, a table mounted on the support for rotation in its own plane and having a transparent portion in the beam of light for supporting an article to be tested in the beam of light, means mounted on said cradle for simultaneously rotating said threaded members equal amounts to raise and lower the support and the table along said light beam to bring the focal point within the article under test, means mounted on said cradle for rotating said table relative to said cradle in the plane of said table, means for tilting said cradle, and means for indicating the degree of tilt of said cradle.

10. In an optical testing apparatus, a tank for receiving a liquid having an index of refraction similar to that of the article to be tested, said tank having a transparent element in its base, an optical system for passing a beam of light through said tank and said transparent member and having a predetermined focal point within the tank, a tiltable cradle mounted in said tank and having an opening in alignment with said beam of light, a plurality of threaded members mounted on said cradle, a support having an opening in alignment with the beam of light threadedly mounted on and movable up and down by said threaded members, a table mounted on said support for rotation in its own plane and having a transparent element in the beam of light for receiving an article to be tested in the beam of light, a gear on each of said threaded members, a common gear engaging all of the gears on said threaded members, means for rotating one of said gears whereby all of said gears and said threaded members will be caused to rotate to raise or lower said support and said table to bring the focal point within the article on the table, a gear surrounding and attached to said table, a driving gear therefor rotatably mounted on the support for vertical movement with said table, and a shaft rotatably mounted on the cradle and splined to the driving gear for actuating the driving gear to rotate the table, said splined shaft permitting vertical movement of the driving gear with the table as it is raised and lowered.

BETHEL J. BABBITT.